United States Patent [19]
Hopkins et al.

[11] 4,092,571
[45] May 30, 1978

[54] POWER MATCHING SYSTEM FOR A TRAIN OF INDIVIDUALLY POWERED TRANSIT VEHICLES

[75] Inventors: Robert John Hopkins; Thomas Detlor Stitt; Hillert Vitt, all of Erie, Pa.

[73] Assignee: General Electric Company, Erie, Pa.

[21] Appl. No.: 740,333

[22] Filed: Nov. 9, 1976

[51] Int. Cl.² ............................................. H02P 1/56
[52] U.S. Cl. .................................. 318/106; 318/109; 318/111
[58] Field of Search ............... 318/105, 106, 109, 110, 318/111, 112, 113

[56] References Cited

U.S. PATENT DOCUMENTS

| | | | |
|---|---|---|---|
| 3,562,612 | 2/1971 | Munson | 318/106 |
| 3,800,197 | 3/1974 | Mehta | 318/111 X |
| 3,803,465 | 4/1974 | Akamatsu | 318/111 X |

Primary Examiner—B. Dobeck
Attorney, Agent, or Firm—James H. Beusse

[57] ABSTRACT

A power match system for a train of individually powered traction vehicles in which two distinct types of power control systems are employed. The system includes a programmed power matched circuit which has programmed therein the volt-ampere characteristics of a motor operating under the control of one of the types of power control systems, such as a cam controlled resistor system. The power match circuit is serially inserted in the current command system for the other type of power control, such as a chopper controlled power system. A signal representative of the motor CEMF in the chopper system is supplied to the power match circuit which then regulates the current supplied by the chopper control power system in accordance with the programmed characteristics of the cam controlled resistor system. In this manner the motive power developed by the two distinct types of power control systems is matched whereby each type of system provides substantially the same pulling power to the train.

6 Claims, 6 Drawing Figures

POWER MATCHING SYSTEM FOR A TRAIN OF INDIVIDUALLY POWERED TRANSIT VEHICLES

BACKGROUND OF THE INVENTION

The present invention relates to electric traction motor vehicles and, more particularly, to a system for matching the torque developed by a direct current electric traction motor in a time ratio controlled power system to that of a similar motor being operated in a cam controlled power system.

Transit vehicles such as subway cars are typically operated in trains, i.e., a plurality of cars are mechanically and electrically coupled to operate as a single unit. However, each car in the train has its own propulsion and control system, the control system being connected to receive operating command signals from a lead car in the train. Historically, the propulsion and control systems in each car have been essentially identical electrical systems, e.g., direct current (d-c) series wound traction motors provided motive power and a cam controller regulated the tractive effort produced by the d-c motors. Since each car's electrical motive power system was essentially identical, an operator's command to a train of cars would result in each car responding essentially identically. Thus each car's motive power system need only be capable of supplying the power required for that car. This maximum level of required power becomes a fundamental consideration since, in order to make a transit or subway car economically practical, passenger space is maximized at the expense of available space for motive power equipment. As will be appreciated, if the motive power system on one of the cars of a train attempts to develop more acceleration than that of other cars of the train, that car will attempt to pull more than its share of the weight of the train to the detriment of its motive power system.

In a cam controlled direct current traction motor power system, a plurality of cams mechanically coupled to a central shaft are arranged to selectively actuate a plurality of electromechanical contacts. These contacts serve to connect the d-c electric traction motors on the car into particular configurations. For example, in one position the armature windings of several motors may be serially connected across a d-c power source so that each motor operates on some fraction of the total source voltage. In a second position the armature windings of pairs of motors on a truck may be connected across the d-c power source so that full source voltage is available to each pair of motors. The cam controller also controls contacts which selectively add or subtract series resistors from the armature current path of the motors in order to regulate armature current, or rather to maintain armature current at a constant level until the d-c motor characteristics force the current to decay below the regulated level. Thus the motive power produced by the d-c motors is controlled by controlling the resistance in series with the motors and the connection of the motors rather than directly regulating the d-c power source.

When a different type of motive power system is to be utilized in selected cars of a train in which other cars of the train employ cam controlled series wound d-c motors, it is desirable that the control systems of both types of motive power systems be capable of responding in an identical manner to the operator's command. For example, if an electronic controller capable of uniformly varying the power applied to a traction motor is to be used to propel one car of a train, it is desirable that the electronic controller be adapted to control its associated motors in such a manner that the torque or power developed by the electronically controlled motors is equivalent to or matches the power developed by each cam actuated, incrementally variable resistor controlled motors. A similar problem arises if the traction motor on one car are of a different type such as separately excited or shunt-wound d-c motors.

Accordingly, it is an object of the present invention to provide a method and apparatus for matching the power developed by a d-c traction motor in an electronic power control system to that developed by a similar or different type of motor in a different type control system.

SUMMARY OF THE INVENTION

In a preferred embodiment the present invention teaches a power matching system for a direct current electric traction motor incorporating a function generator. The generator is programmed with the volt-ampere characteristics as a function of selected operating states of a set of motors on the type of car to be power matched. Where the traction motors are utilized on cars in a train of traction vehicles, the operating states of the motors are specified by train line signals and these signals are applied to the function generator in order to specify the desired volt-ampere characteristics to be generated. A voltage sensor monitors motor terminal voltage and supplies a voltage signal representative thereof to the function generator. In response the function generator provides a reference signal representative of the current which would exist in the set of motors to be matched at the measured terminal voltage. The reference signal is then applied to a power conditioning system which regulates the motor armature current to the reference level. In a further embodiment the motor characteristics produced by the function generator are modified in response to the magnitude of available excitation voltage to be applied to the motor.

DESCRIPTION OF THE DRAWINGS

These and other objects, features and advantages of this invention will be better understood by reference to the following detailed description when considered in conjunction with the accompanying drawings in which.

DETAILED DESCRIPTION

Figure 1:
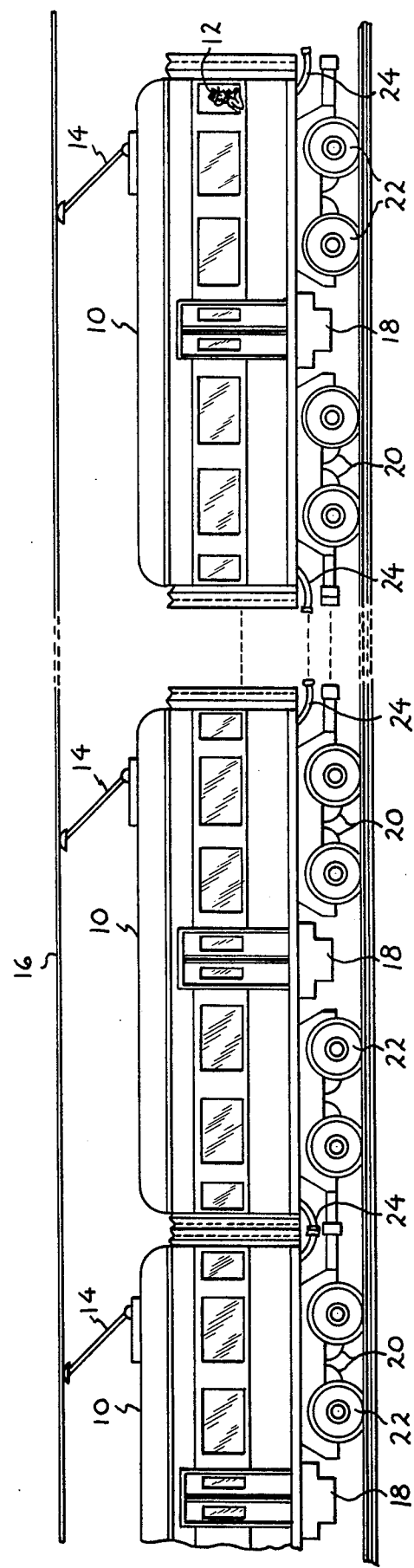
FIG. 1 is an illustration of a transit vehicle arrangement indicating the interconnection of diverse types of propulsion systems.

Referring to FIG. 1 there is shown a plurality of electrically powered transit vehicles 10 mechanically and electrically connected to operate in a train in response to commands from an operator 12. In the illustrative embodiment the train receives power from a wayside power source. Each vehicle 10 includes a power collection device illustrated as a pantograph 14 adapted to receive power from an overhead catenary 16 and to supply power through a power conditioning system 18 to electric traction motors 20 mounted in driving relationship with vehicle wheels 22. The operator commands, generally referred to as train line signals, are supplied to the power conditioning system 18 via train line cables 24 which electrically interconnect the transit vehicles. The train line signals are commonly digital status signals which specify the commanded operating states or conditions of the traction motors which, in terms of series-wound d-c motors, are generally full field, intermediate field or minimum field along with a particular maximum armature current level. The operator 12 may also call for series or parallel connection of the motors on a vehicle, i.e., a selected number of motors, typically four, may be connected in series so that only a fraction of the voltage on catenary 16 is available to each motor or pairs of motors may be connected in parallel whereby the catenary voltage is available to each pair of motors. It is noted that the train line signals to each vehicle 10 are identical and thus that each vehicle must respond essentially identically if the tractive effort of the train is to be distributed uniformly over the train so that no one of the vehicles 10 attempts to pull more than its share of the train.

Figure 2:
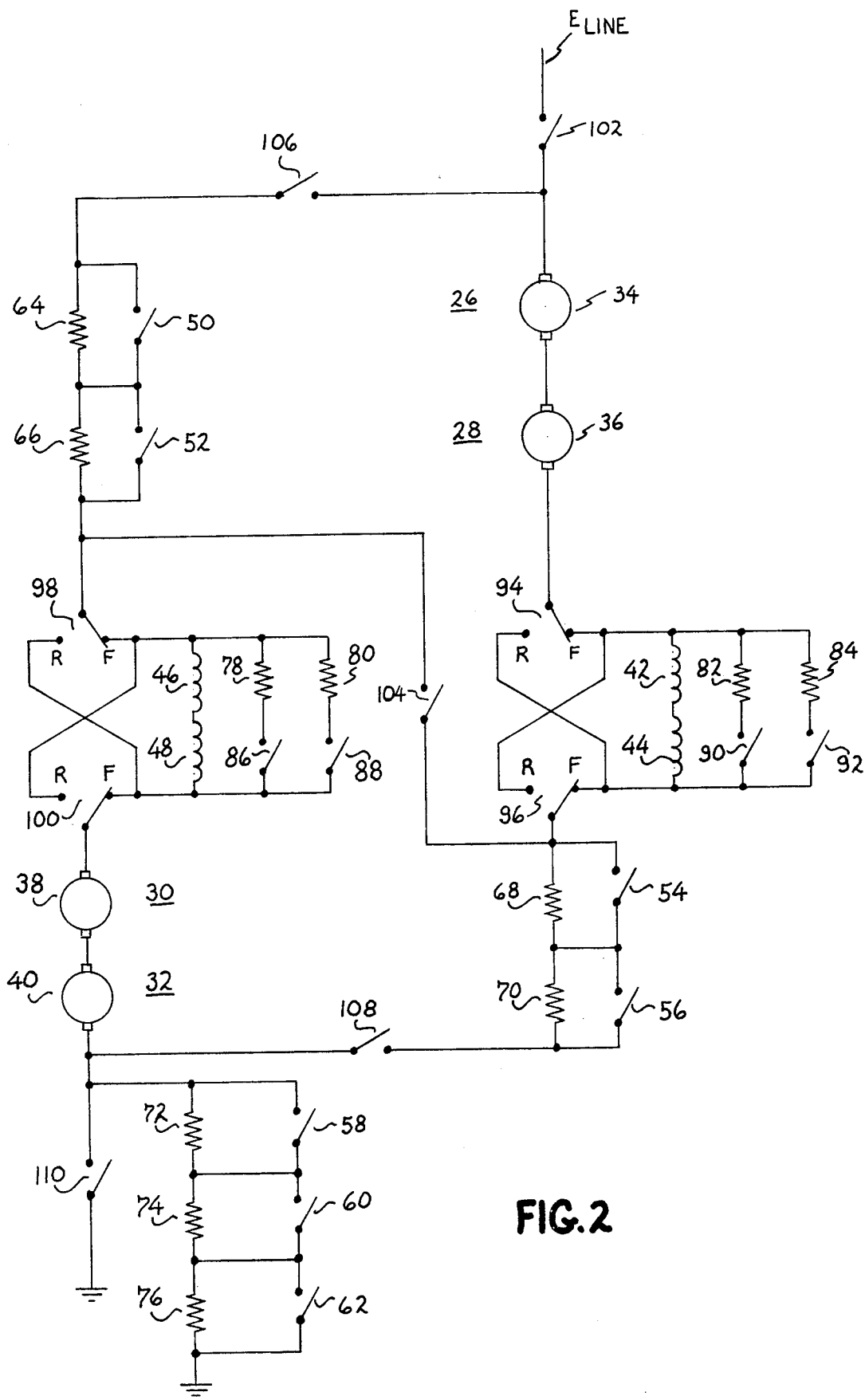
FIG. 2 is a simplified schematic diagram of a prior art resistor controlled d-c motor system.

Referring now to FIG. 2, there is shown a simplified schematic of a contact controlled power circuit which may be utilized as one of the power conditioning systems at 18 in FIG. 1 for controlling direct current series wound electric traction motors 26, 28, 30 and 32. The traction motors 26, 28, 30, and 32 each include a corresponding armature 34, 36, 38, and 40 and a corresponding field winding 42, 44, 46, and 48.

The circuit also includes a plurality of sets of contacts numbered 50 through 62 which are cam actuated by a motor driven controller (not shown) in a preselected sequence to step resistance out of the circuit to control the tractive effort developed by motors 26, 28, 30, and 32. The contacts 50 through 62 are associated with load resistors 64 through 76 respectively, which load resistors are connected as shown to limit current flow through the traction motors and their associated field windings to control motor acceleration.

Shunt switching means in the form of resistors 78 through 84 and contacts 86 through 92 are associated with motor field windings 42, 44, 46, and 48. The contacts 86 through 92 allow the resistors 78 through 84 to be selectively connected in parallel with field windings 46 and 48 and with field windings 42 and 44, to provide field weakening of the motors at higher motor speeds.

Four cam actuated reversing contacts 94, 96, 98, and 100 in the form of single pole, double throw switches are arranged to connect the traction motor field windings for either forward or reverse modes of operation. The traction system receives a voltage $E_{LINE}$ from a direct current source (not shown) which may be connected to the system via the aforementioned catenary 16 and pantograph 14 through a switch 102.

A switch 104 is arranged to connect the four traction motors in series relationship with the load resistors 72, 74, and 76 to form a high resistance connection which is used over the lower speed ranges where the generated back electromotive force (EMF) of the traction motors is of lower magnitude. A parallel connection, adapted for use in the higher speed ranges, is formed by the opening of the switch 104 and the closing of switches 106, 108, and 110. With the latter arrangement, two series connected circuit banks are connected in parallel with each other, one bank being formed by the series connection of traction motors 26 and 28 and the load resistors 68 and 70 and the other bank being formed by the series connection of traction motors 30 and 32 and the load resistors 64 and 66.

It will be noted that for the series connection formed by the closing of switch 104 with switches 106, 108, and 110 being opened, the load resistors 64, 66, 68, and 70 are cut out of the circuit, and resistance switching of the load resistors 72, 74, and 76 is relied upon for control of tractive effort. For the parallel connection, with switch 104 open and switches 106, 108, and 110 closed, the load resistors 72, 74, and 76 are cut out of the circuit by the shunt connection formed by switch 110, and for this arrangement control of traction effort is accomplished by resistance switching of the resistors 64, 66, 68, and 70.

It should be noted that the circuit of FIG. 2 is highly simplified and that in an actual power circuit the staging resistors 64 through 76 would likely comprise at least twice the number of resistors illustrated and the contacts 50 through 62 would be increased even more and arranged to provide serial and parallel connections of the associated resistors. Such arrangements are well known in the art and are shown and described, for example, in U.S. Pat. Nos. 3,184,664 and 3,068,390. Similarly, the shunt resistors 78 through 84 providing field weakening generally comprise a plurality of resistors which allow relatively small steps of current shunting to be accomplished thereby allowing armature current to be regulated at a substantially constant magnitude until all the stages of resistance have been utilized.

In the operation of the circuit of FIG. 2, with switch 102 and 104 closed, power is applied through motors 26 and 28, switch 104, motors 30 and 32, and resistors 72, 74, and 76 and an initial current is established through this circuit path. As the motors accelerate the back EMF of the motors subtracts from the applied voltage causing the motor current to begin to fall off. The motor driven controller begins to step through its various positions sequentially closing the contacts 58, 60, and 62 in order to maintain the current through the motors at a desired regulated level. Once the resistors 72, 74, and 76 have been removed from the circuit such that motors 26, 28, 30, and 32 are serially connected directly across the power source, the controller steps through another sequence and opens the switch 104 while closing the switches 106, 108, and 110. This action results in the motors 26 and 28 being serially connected in one current path and the motors 30 and 32 being serially connected in another current path. The staging resistors 64, 66, 68, and 70 are connected in series with their respective motors for regulating motor current in each path. It is noted that the resistors 64, 66, 68, and 70 are selected such that when the motors are placed in parallel across the power source, the initial voltage across each motor remains the same as it was just prior to the switching action. The controller then continues to step through its various positions and selectively closes contacts 50, 52, 54, and 56 to thereby remove the additional series resistors from their respective motor circuits and resulting in each of the two series motor pairs being connected directly across the power source. It will be appreciated that in a four motor system during initial acceleration the motors are serially connected to the power source whereby the maximum available voltage to each motor is one-fourth of the power source voltage. When switched to the two series, two parallel arrangement, one-half of the power source voltage becomes available to each motor.

If nothing further were done at this time the reverse EMF of the motors would continue to build up with speed and their torque would begin to fall off along the motor characteristic curves as a result of the decrease in motor flux and armature current with the increase in motor speed. As is well known, however, in order to maintain armature current at the regulated level and thereby maintain the motor torque at a higher level, the resistors 78, 80, 82, and 84 are connected in parallel with their associated motor field windings to thereby shunt a portion of the armature current away from the corresponding field winding. Thus, the motor controller steps through additional positions and selectively closes the contacts 86, 88, 90, and 92 to thereby place the motors into a weak field mode of operation. In this weak field condition the torque drops, although not as rapidly as it would with a constant field, but the horsepower of the two motors is maintained at a constant level. After the contacts 86, 88, 90, and 92 have all been closed the motor armature current begins to decrease as the back EMF of the motors increases thereby causing the torque output of the motors to drop along the motor characteristic curves.

Figure 3:
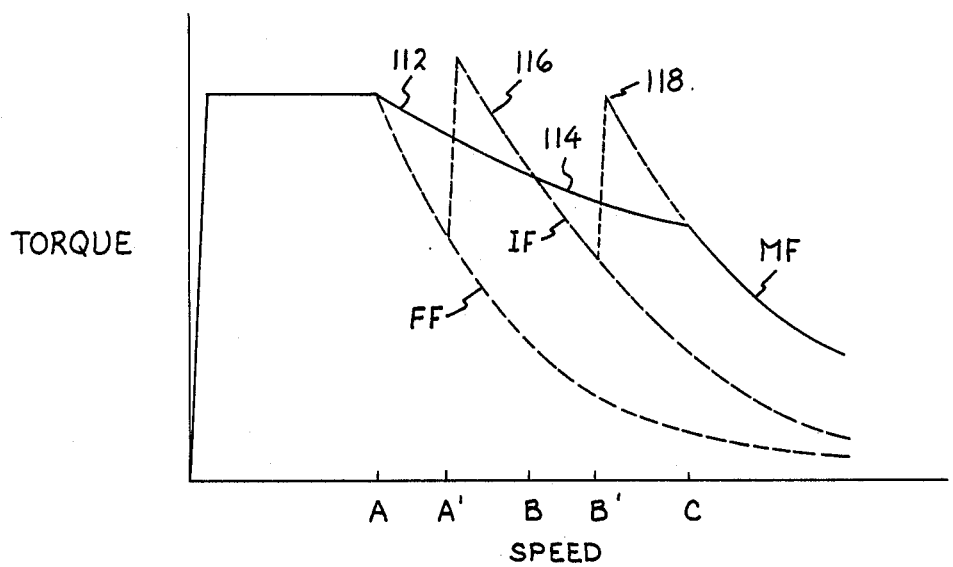
FIG. 3 is a graph illustrating typical d-c motor operating characteristics.

For a better understanding of the operations of the motors 26, 28, 30, and 32, reference may be had to FIG. 3 in which there is shown a typical torque versus speed curve for a series connected direct current electric traction motor. As can be seen, when power is applied, motor torque rises rapidly to a regulated level as a result of armature current through the motor rising to a regulated level. The armature current is regulated at a substantially constant level from speed 0 to speed A by sequentially removing resistors from the motor current path as was described previously with reference to FIG. 2. Accordingly, motor torque remains substantially constant over this range. At point A all the resistance has been removed from the motor path and the motor is placed directly across the power source. If no further action were taken the motor torque would fall off along the curve marked FF, for Full Field, dropping rapidly as armature current dropped as a result of the back EMF of the motor increasing with motor speed. However, as was previously described, at the point A field weakening is initiated by connecting shunt resistors in parallel with the motor field winding so that motor armature current is bypassed around the field winding thereby maintaining armature current at the regulated level.

As previously described an actual motor power circuit will include a plurality of shunt resistors thereby allowing armature current to be substantially smoothly regulated. In general, a command for an intermediate field (IF) condition will result in a plurality of resistors being selectively connected in parallel with the motor field winding so that the motor torque will follow the curve marked 112 from speed A to speed B. Without a change in the commanded value, the armature current will no longer be regulated and torque will therefore begin to drop along the curve marked IF. However, if at point B a minimum field (MF) condition is commanded, additional resistance staging will be implemented and the motor torque will follow the curve marked 114 from point B to point C. From point C torque begins to drop along the MF curve.

For the illustrated motor circuit only two stages of resistance are shown; therefore, the torque regulation circuit would allow motor torque to follow the full field (FF) curve to speed A' before connecting a resistor in parallel with the field. When the IF resistor is connected in shunt, the motor torque will jump rapidly to point 116 and then fall along the IF curve to speed B'. At speed B' the MF resistor is connected in shunt and the torque will jump to point 118 and then fall along the MF curve. It will be appreciated by those skilled in the art that the curves indicated at 112 and 114 are the desired motor curves and represent the theoretical average of torque over the operating range of the motor. In particular it will be noted that because the control is a resistor control which places steps of resistance in and out of the circuit, the actual torque curve would appear as a series of saw tooth waveforms having an average value substantially as indicated by line segments 112 and 114. Of course the more resistance steps that are placed in the motor current path, the smaller these steps of torque will be and the more closely the actual value of torque will approach the desired value of torque.

Figure 4:
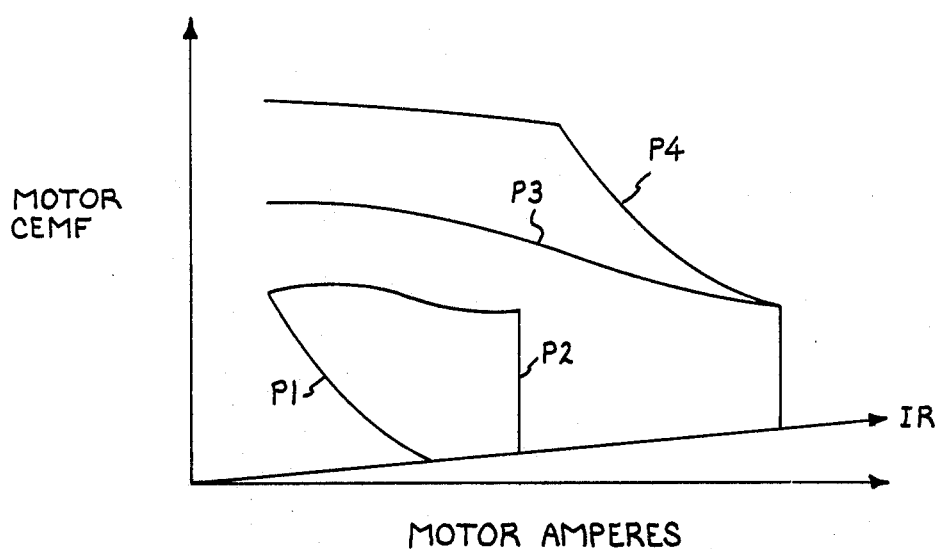
FIG. 4 is a graph illustrating typical volt-ampere characteristics for a series wound d-c motor in a cam controlled resistor power system.

Referring now to FIG. 4 there is shown a set of curves representative of the volt-ampere characteristics of a direct current electric traction motor operating in a contact controlled power circuit of the cam actuated type such as that illustrated in FIG. 2. The volt-ampere characteristics may be obtained by direct measurement or by calculation from motor data available from the manufacturer in conjunction with known cam controller characteristics. The methods of calculation of motor curves are illustrated in Chapter 4, section 6, of Professor Gordon R. Slemon's text Magnetoelectric Devices: Transducers, Transformers and Machines, published in 1966 by John Wiley and Sons, Inc., New York, N.Y.

Four distinct motor operating curves are illustrated in FIG. 4. Each curve is established by a particular setting of a control lever in the cam control system. In train terminology, the control lever may be positioned in a plurality of notch or power positions, each notch position specifying a particular operating condition, such as, for example, a maximum armature current level for the motors. A discussion of the operation of a cam controller is provided in the aforementioned U.S. Pat. Nos. 3,184,664 and 3,068,390. In the first notch position, designated P1, current is limited by the magnitude of resistance in series with the motor and by the resistance inherent in the motor itself. Accordingly, current increases substantially linearly along the IR line (representing source volts divided by circuit impedance) until it is limited by the resistance in the circuit. As the motor armature begins to rotate, a counter electromotive force (CEMF) is generated and motor current reduces in accordance with the illustrated characteristic. It will be appreciated that this characteristic is typical for a series d-c motor with limited voltage excitation.

In the second notch position indicated by the characteristic P2 curve, the cam controller removes resistance from the series circuit and regulates the motor current until the current is again limited by the available supply voltage. The third and fourth notch positions, indicated by P3 and P4 respectively, again establish maximum current levels for the motors and the cam controller attempts to regulate to these maximum limits by removing resistors from the series circuit and by implementing field weakening. It will be noted that the available supply voltage magnitude is higher in these latter notch positions as a result of the motors being switched from a series to a parallel circuit arrangement.

It will be apparent that the characteristic curves of FIG. 4 define voltage and current limits for the traction motors. In the actual control of the motors by the cam controller, the control attempts to regulate motor current to the maximum value allowed or called for in the specified notch position. Motor voltage or CEMF, being a function of armature rotational speed, limits the motor current only when vehicle speed approaches the maximum value for the selected notch position. During electrical braking the motors are operated on somewhat different voltage-current curves (not shown) and these curves are specified by additional power or notch positions indicated as B1, B2, and B3 in train terminology.

Figure 5:
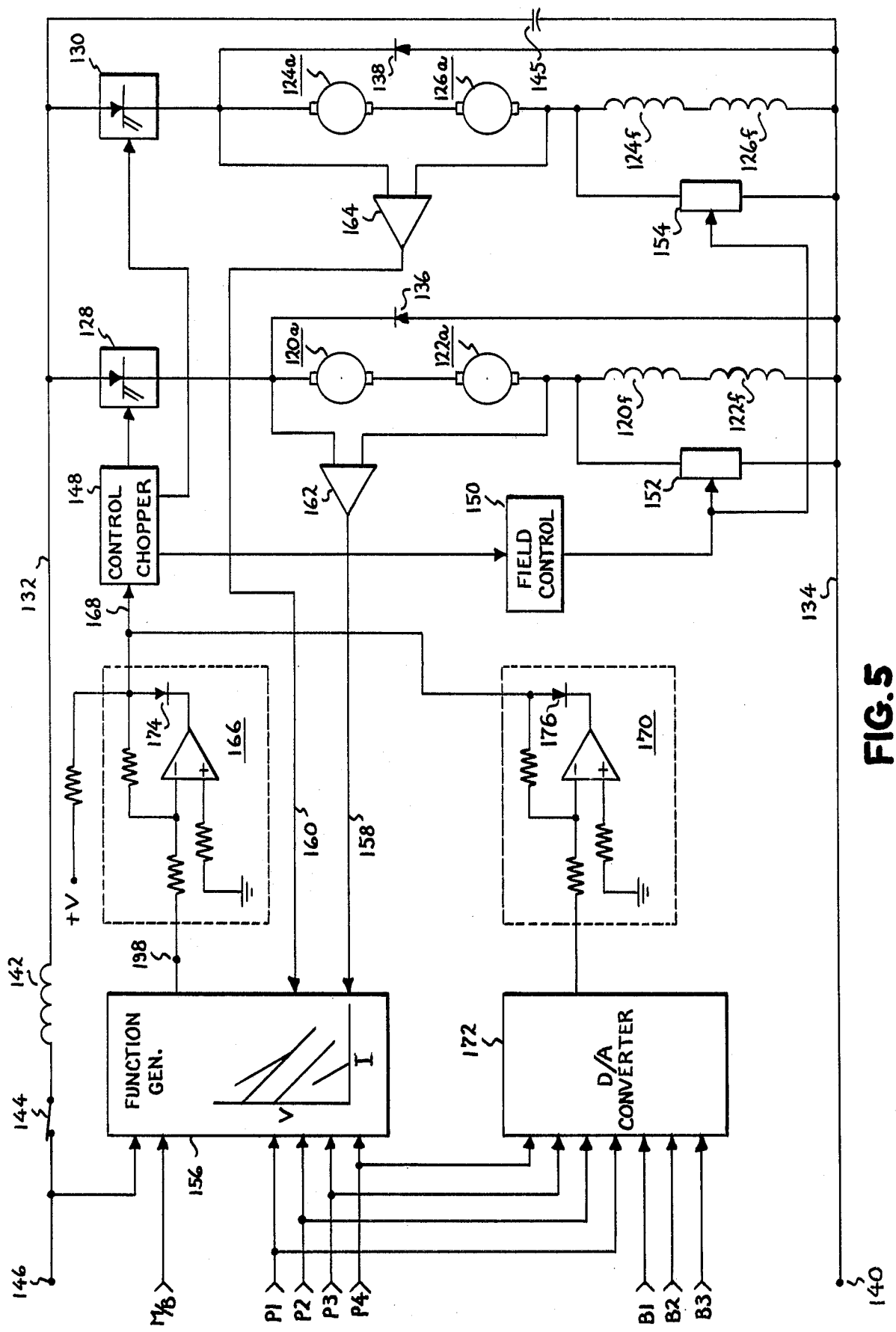
FIG. 5 is a simplified schematic of an electronic power control system for a series wound d-c motor incorporating the present invention.

Referring now to FIG. 5 there is shown a power circuit for a traction vehicle employing the teaching of the present invention. The power circuit includes four motors 120, 122, 124, and 126 arranged in a two series, two parallel configuration, i.e., two parallel current paths with two motors serially connected in each path. The motors each have serially connected armature windings and field windings identified with subscripts a and f, respectively. Power is supplied to each parallel current path through a variable time ratio power control circuit illustrated as choppers 128 and 130, each chopper being serially connected between a pair of motors and a positive power bus 132. Alternatively a single chopper could supply all motors. Each of the pair of motors also has a terminal connected to a negative power bus 134. The choppers 128 and 130 are well known in the art and are of the type described in the SCR Manual, Fifth Edition, published in 1972 by the General Electric Company, Semiconductor Products Department, Schenectady, N.Y. As is known the choppers operate as electronic switches to regulate current by controlling the ratio of conducting time to non-conducting time. When conducting, the choppers 128 and 130 effectively connect their respective motor pairs 120, 122, and 124, 126 between the positive and negative voltage busses 132 and 134. During the non-conducting time of choppers 128 and 130, motor current flows in a closed loop path through each of the motor pairs and their respective free-wheeling diodes 136 and 138. Negative voltage bus 134 is connected to a negative power source terminal 140 and positive voltage bus 132 is connected through a filter reactor 142 and series disconnect switch 144 to a positive power terminal 146. For transit vehicles, terminals 140 and 146 will be adapted for connection to a wayside power source such as that illustrated in FIG. 1. A filter capacitor 145 interconnects busses 132 and 134.

A chopper control circuit 148 provides gating signals to choppers 128 and 130 to regulate the ratio of conducting to non-conducting time of the choppers. The conduction ratio is regulated in response to a commanded current magnitude for the motors in comparison to the actual magnitude of current in the motors. A signal representing the actual current magnitude is provided by current measuring reactors (not shown) located in the current paths of each motor pair. The details of a logic circuit for controlling a chopper are shown in the aforementioned SCR Manual and the details of a circuit for controlling motor current using a chopper are shown in U.S. Pat. No. 3,866,098 Weiser, issued Feb. 11, 1975 and assigned to the General Electric Company.

Field weakening is implemented by means of a field control circuit 150 which responds to field current control signals and supplies control signals to field weakening circuits 152 and 154. Field weakening circuit 152 is connected in a parallel circuit arrangement with motor field windings 120f and 122f and field weakening circuit 154 is connected in parallel circuit arrangement with field windings 124f and 126f. Control circuit 150 and field weakening circuits 152 and 154 can be implemented by using components and circuits well known in the art, and the details of such circuits are not necessary to an understanding of the present invention. An arrangement suitable for use in a chopper system of the type being described is illustrated, by way of example, in the aforementioned U.S. Pat. No. 3,866,098.

Figure 6:
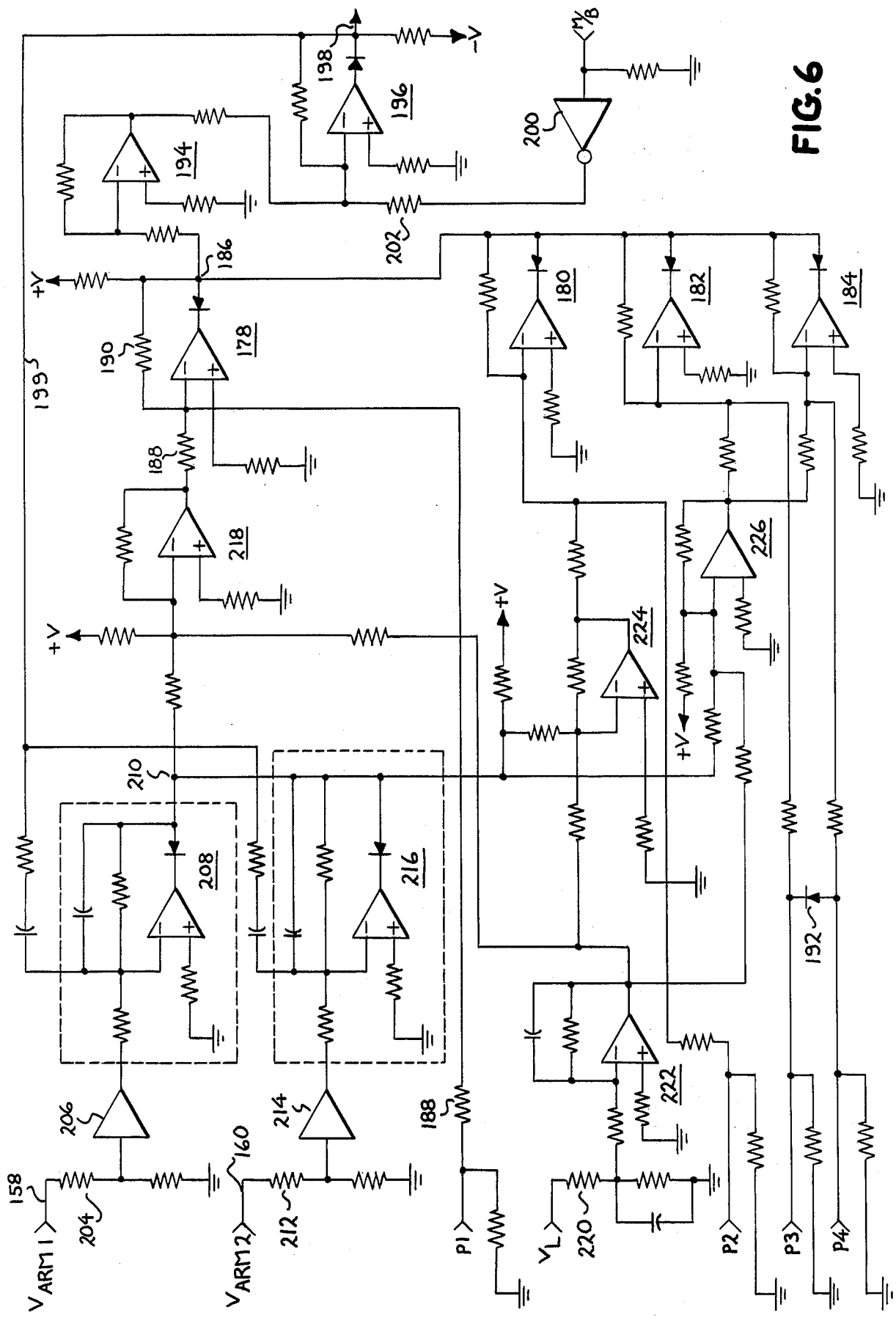
FIG. 6 is an exemplary schematic of a programmed power match circuit.

The inventive control circuit comprises a programmed voltage matching circuit connected for monitoring motor terminal voltage or CEMF and for providing current command signals to chopper control circuit 148 which are a function of the motor CEMF and the particular commanded notch position for the motor. The power matching circuit includes a function generator 156 which has programmed therein straightline approximations of the motor volt-ampere characteristics illustrated in FIG. 4. Function generator 156 can be implemented by using components and circuits well known in the art, and the particular components and circuits selected for this purpose are a matter of design choice. Various techniques for designing function generators are disclosed, by way of example, on pages 482 et seq. of the book Analog Computation by Albert S. Jackson (McGraw-Hill Book Co., Inc., New York, N.Y. 1960). The motor characteristic curve for each throttle level notch position is determined by the train line signals indicated at P1, P2, P3 and P4. In present day train usage these power signals and the aforementioned brake signals B1, B2, and B3 are transmitted to the vehicles making up the train as digital signals. The trainline signals may therefore be used as switch signals to enable selected portions of function generator 156. A preferred embodiment of function generator 156 is illustrated in FIG. 6.

Still referring to FIG. 5, signals representative of motor armature voltage are supplied to function generator 156 via lines 158 and 160. These signals are developed by means well known in the art, such as by the illustrated differential comparison circuits 162 and 164. As is well known the circuits 162 and 164 will include suitable buffering circuits for converting the relatively high voltage appearing across the motor armatures to voltage levels within the operating range of electronic circuits. Comparison circuit 162 includes first and second input terminals connected respectively to the junction intermediate armature 120a and chopper 128 and to the junction intermediate armature 122a and field winding 120f. An output terminal of circuit 162 is connected to line 158. Similarly, comparison circuit 164 has first and second input terminals adapted for connection across the series connected armatures 124a and 126a and an output terminal connected to line 160. As will become apparent, the armature voltage signals from circuits 162 and 164 are the primary control signals for regulating armature current through function generator 156.

Function generator 156 includes a plurality of input terminals adapted for receiving the train line signals P1, P2, P3 and P4. In a cam controlled motor system each of these train line signals selects a particular operating condition thus selecting a particular voltage to current relationship for the motors in the system. Accordingly, these train line signals select in function generator 156 a particular voltage to current relationship. Function generator 156 therefore provides a motor current command signal specifying a current magnitude corresponding to the armature voltage magnitude identified by the signals from circuits 162 and 164, i.e., the functions implemented by function generator 156 approximate the voltage-current relationships that characterize the traction motors of a resistor switching system under various operating conditions determined by the trainline signals. The motor current command signal is applied to an operational amplifier 166 of a type well known in the art which suitably conditions and inverts the current command signal before applying it via line 168 to chopper control circuit 148.

It will be noted that line 168 is also connected to an output terminal of an operational amplifier 170. This latter amplifier provides a maximum current limit signal consistent with the power level called for by the trainline signals. To supply this limit signal, the digital trainline signals are applied to a digital to analog (D/A) converter 172 whereby they are converted to an analog signal representative of the maximum current limit for the selected power level. The analog signal from D/A converter 172 is supplied to amplifier circuit 170 which conditions and inverts the signal for application to chopper control circuit 148. As will be apparent to those skilled in the art, the signal on line 168 will correspond to the least positive signal magnitude from amplifiers 166 and 170 by virtue of the summation of the signals through diodes 174 and 176. In the illustrative system maximum motor currents occur in response to a maximum positive voltage signal magnitude on line 168. This maximum signal magnitude is established by amplifier 170 in response to the trainline signals. As armature voltage increases, the current command signal from function generator 156 is reduced in amplitude resulting in a reduction in amplitude of the signal from amplifier 166 whereby the signal on line 168 is reduced.

In the preferred embodiment function generator 156 is responsive to the magnitude of available source voltage appearing at terminal 146 to modify the current command signal accordingly. Such modification is desirable since the current in the resistor controlled motor system will be similarly modified with changes in available source voltage due to the fact that current is a function of source voltage divided by circuit impedance.

During electrical braking a motor/brake (M/B) command signal applied to function generator 156 is effective to force the current command signal to a negative level whereby a maximum motor current is commanded by amplifier 166. D/A converter 172 responds to the brake command signals B1, B2 and B3 to provide a signal through amplifier 170 to regulate the current command signal on line 168 to the desired level. Thus the M/B signal effectively biases generator 156 out of the current regulating circuit whereupon the B1, B2, and B3 signals are utilized to regulate braking current. It is noted that the function generator 156 is illustrated as providing a reduction in motor current with an increase in armature voltage without holding the motor current constant over some range of armature voltage as is shown in FIG. 4. It will be appreciated by those skilled in the art that the constant motor current characteristic is established by means of the current command signal from amplifier 170 in response to the digital trainline signals.

Referring now to FIG. 6 there is illustrated form of the function generator 156 which comprises a plurality of diode coupled operational amplifiers 178, 180, 182, and 184 for producing an output signal that varies as a selected one of an assortment of predetermined functions of a variable input signal. As is well known the magnitude of voltage appearing at terminal 186, i.e., the terminal common to the output of each of the amplifiers, will be determined by the amplifier developing the least positive output signal. For example, during initial acceleration P1 will be a positive magnitude voltage signal while P2, P3, and P4 will be at zero voltage magnitude. Thus the signal developed by amplifier 178 will be a negative voltage having a magnitude determined by the relative value of input resistor 188 and feedback resistor 190. During this time the zero voltage magnitude P2, P3, and P4 signals will cause the output signals developed by amplifiers 180, 182, and 184, respectively, to attempt to be at approximately 0 volts. Since amplifier 178 clearly provides the least positive output signal, the signal at terminal 186 will follow the output signal from amplifier 178. Similar operation will occur for selection of P2, P3, and P4 notch positions. However, it should be noted that for the P4 power command, the function generator 156 will provide a maximum current command signal as a function of the combination of the signals developed by amplifier 182 and 184. In particular the P4 signal is coupled through a diode 192 into amplifier 182. By reference to FIG. 4 it can be seen that the power curve characteristic of the P4 power position initially follows the P3 power curve before branching off to a separate power profile. Accordingly, the amplifiers 182 and 184 are designed such that the initial portion of the P4 power curve is determined by amplifier 182 which normally responds to the P3 signal to control the P3 power curve.

Terminal 186 is connected to an input terminal of a buffer amplifier 194 which buffers the signal at terminal 186 before application to the final amplifier 196. The signal appearing on line 198 at the output of amplifier 196 is the current command signal which is applied to amplifier 166 in FIG. 5.

It will be noted that the M/B signal is coupled to the inverting input terminal of amplifier 196 through a buffer amplifier 200 and an input resistor 202. During motoring the M/B signal is a logic 1 or positive voltage magnitude signal whereby the signal appearing at the output terminal of amplifier 200 is a logic 0 level signal, i.e., substantially zero voltage magnitude, and does not affect the operation of amplifier 196. During braking, however, the M/B signal is a logic 0 signal and the signal developed by amplifier 200 is a logic 1 or positive voltage magnitude signal which forces the output signal from amplifier 196 to a maximum negative voltage level effectively preventing the function generator 156 from controlling the motor current command signal.

As will be understood by those skilled in the art, the function generator as thus far described will provide only discrete output signal levels as commanded by the power or notch signals P1, P2, P3 and P4. In order to form an output signal as a function of armature CEMF and available source voltage generator 156 includes means for selecting from the armature voltage signals on lines 158 and 160 the signal of least magnitude and for combining that signal with a signal $V_L$ (representative of available source voltage) to produce a voltage signal to modify the motor current command signal. More particularly, the positive voltage $V_{ARM1}$ signal on line 158 is coupled through a resistor 204 and an inverting amplifier 206 to an operational amplifier 208, the amplifier 208 having an output terminal diode connected to terminal 210. The positive voltage $V_{ARM2}$ signal on line 160 is coupled through a resistor 212 and an inverting amplifier 214 to an operational amplifier 216, the amplifier 216 also having an output terminal diode coupled to terminal 210. Due to the inversion of the armature voltage signals in amplifiers 206 and 214, the signals applied to amplifiers 208 and 216 will be of negative polarity and, being applied to the respective inverting input terminals of amplifiers 208 and 216, will result in positive polarity signals being developed at their respective output terminals. By virtue of the polarity of the diode coupling between terminal 210 and the output terminals of amplifiers 208 and 216, the voltage at terminal 210 will be representative of the $V_{ARM}$ signal of least positive magnitude.

The signal developed at terminal 210 is coupled to the inverting input terminal of an operational amplifier 218 where it is combined with a signal representative of source voltage. This latter signal is developed from the $V_L$ signal (from terminal 146 in FIG. 5) which is applied through a resistor 220 and an operational amplifier 222 to the inverting input terminal of amplifier 218. An output terminal of amplifier 218 is coupled to the inverting input terminal of amplifier 178 where it operates to modify the magnitude of the P1 signal also appearing at the inverting input terminal. Clearly, as the $V_{ARM1}$ and $V_{ARM2}$ signals begin to increase (due to acceleration of the motors), the signal at terminal 210 will similarly increase in magnitude. Assuming the $V_L$ signal remaining at constant magnitude, the increased voltage at terminal 210 will result in a signal of larger negative magnitude appearing at the output terminal of amplifier 218. Of course, the magnitude of the signal developed at the output terminal of amplifier 218 will also be modified in proportionate response to any changes in the source voltage magnitude $V_L$. The signal developed at the output terminal of amplifier 218, since increasing in a negative direction, forces a reduction in the net amplitude of the signal appearing at the inverting input terminal of amplifier 178 with a consequent reduction toward zero of the negative voltage magnitude signal appearing at terminal 186. Because of the double inversion through amplifiers 194 and 196, the signal on line 198 is substantially equivalent to the signal at terminal 186 and thus also reduces from a high negative value toward zero as armature voltage increases. It is noted that a feedback loop is provided via line 199 to the inverting input terminals of amplifiers 208 and 216. Such a feedback loop has been found advantageous in preventing oscillations and stabilizing the function generator circuit.

If the system is operated in the P2, P3, or P4 modes rather than P1, the control amplifiers will be 180, 182, and 184 respectively. As is apparent the voltage signal at terminal 210, representative of armature voltage magnitude, is summed in operational amplifiers 224 and 226 for application to amplifier 180 and amplifiers 182 and 184, respectively. Again the operation of the function generator in these latter notch positions is identical to the operation in the above-described P1 position, i.e., the trainline command sets the maximum motor current magnitude and the armature voltage signals operates to reduce the level of motor current as armature voltage increases.

Referring again to FIG. 5, it will be appreciated that function generator 156 provides a current command signal on line 198 which has a magnitude determined by the selected power notch position P1, P2, P3, or P4, the magnitude of the available source voltage $V_L$ and the magnitude of the armature voltage signals on lines 158 and 160. After being buffered and amplified by amplifier 166, the current command signal, if more negative than the signal from amplifier 170, is applied via line 168 to chopper control circuit 148 to regulate current supplied by choppers 128 and 130 to motor armatures 120, 122, 124, and 126. Field weakening is implemented by chopper control circuit 148 through field control circuit 150 when the command current level becomes greater than can be attained by operation of the motors in a full field condition. Correlation of the operation of chopper control circuit 148 and field control circuit 150 is discussed in more detail in the aforementioned U.S. Pat. No. 3,866,098.

In the brake mode of operation, function generator 156 is biased out of the control function and braking current levels are established by D/A converter 172 and amplifier 170 in response to the B1, B2, and B3 braking mode control signals.

Although the inventive system has been described in conjunction with a cam controlled motor power system and chopper power system, it will be apparent to those skilled in the art that other d-c motor systems may be power matched using the teachings of the present invention. The appended claims are therefore intended to cover and embrace any such modifications, subject only to the true spirit and scope of the claims.

What we claim as new and desire to secure by Letters Patent of the United States is:

1. In a self-propelled traction vehicle adapted to be operated in a train with other self-propelled vehicles, all of said vehicles including electrically powered propulsion means and control means therefor, the propulsion means comprising electric traction motors connected in driving relationship to wheels of the associated vehicle and power conditioning means adapted for receiving electric power from a power source for energizing said traction motors, said control means being responsive to a plurality of trainline signals supplied from a train operator to each of the vehicles for controlling the associated power conditioning means so as to regulate the tractive effort developed by the traction motors, the power conditioning means of said traction vehicle being of a first type and the power conditioning means of at least one of said other vehicles being of a different type, the improvement comprising:

a. a programmed power matching circuit operatively connected in circuit with the control for the first type power conditioning means of said traction vehicle, said power matching circuit being programmed to produce an output signal that varies as a selected one of an assortment of predetermined functions of a variable input signal, said functions respectively approximating the voltage-current relationships that characterize the traction motors energized by said different type power conditioning means of said at least one other vehicle under various operating conditions determined by said trainline signals;

b. means for supplying as the input signal to said power matching circuit a signal representative of the magnitude of voltage energizing an armature of a traction motor of said traction vehicle;

c. said power matching circuit including means responsive to said trainline signals for selecting whichever one of said assortment of predetermined functions corresponds to the particular operating condition called for by said trainline signals;

d. means for supplying said output signal from said power matching circuit to the control means for said first type power conditioning means; and e. said control means being arranged to control the power conditioning means of said traction motor in response to said output signal so as to regulate traction motor current.

2. The system of claim 1 wherein said power conditioning means of the first type comprises a variable time ratio controlled power circuit and said power conditioning means of the second type comprises a resistor switching system.

3. The system of claim 1 and including:

a. means for supplying a source signal representative of the magnitude of voltage available to said motors from said power source to said power matching circuit; and b. said power matching circuit being responsive to said source signal to vary said output signal as a function thereof.

4. The system of claim 1 wherein said power match circuit comprises a function generator.

5. The system of claim 2 wherein said resistor switching system includes means for interconnecting said traction motors in a four series arrangement during initial acceleration of the vehicle and in a two series, two parallel arrangement during secondary acceleration of the vehicle and wherein said variable time ratio power control system is adapted to maintain said traction motors in a two series, two parallel arrangement at all times.

6. The system of claim 3 wherein said power match circuit is connected to receive a plurality of signals each representative of the magnitude of voltage energizing a corresponding one of a plurality of armatures of traction motors of said traction vehicle, said power match circuit including means for selecting the armature voltage signal of least positive magnitude as said variable input signal.

* * * * *

UNITED STATES PATENT AND TRADEMARK OFFICE
CERTIFICATE OF CORRECTION

PATENT NO. : 4,092,571
DATED : May 30, 1978
INVENTOR(S) : RJ Hopkins; TD Stitt; H Vitt It is certified that error appears in the above-identified patent and that said Letters Patent are hereby corrected as shown below:

Column 12, line 55, insert "means" between "control" and "for"

Signed and Sealed this

Thirty-first Day of October 1978

[SEAL]

Attest:

RUTH C. MASON
Attesting Officer

DONALD W. BANNER
Commissioner of Patents and Trademarks